United States Patent
Drinkard, Jr. et al.

[15] 3,694,485
[45] Sept. 26, 1972

[54] HYDROCYANATION OF OLEFINS

[72] Inventors: William C. Drinkard, Jr., Wilmington, Del.; Brian William Taylor, Verona, Pa.

[73] Assignee: E. I. du Pont de Nemours and Company, Wilmington, Del.

[22] Filed: April 23, 1970

[21] Appl. No.: 43,284

Related U.S. Application Data

[60] Division of Ser. No. 857,535, Sept. 12, 1969, Pat. No. 3,551,474, which is a continuation-in-part of Ser. No. 680,947, Nov. 6, 1967, abandoned.

[52] U.S. Cl. ....260/465.8 R, 260/465 C, 260/465 H, 260/465.3
[51] Int. Cl. ..................C07c 121/04, C07c 121/26
[58] Field of Search...260/465.3, 465.6, 465.9, 465.8

[56] References Cited

UNITED STATES PATENTS

| 3,574,717 | 4/1971 | Lloyd | 260/465.3 X |
| 2,583,984 | 1/1952 | Arthur, Jr. | 260/465.3 |

*Primary Examiner*—Joseph P. Brust
*Attorney*—William A. Hoffman

[57] ABSTRACT

Process of isomerizing 3-pentenenitriles to 4-pentenenitrile using compounds of iron, or ruthenium having a valence of +2 or less as a catalyst and of adding hydrogen cyanide to carbon-carbon double bonds such as in 4-pentenenitrile at from −25° to 200°C using as catalysts ruthenium or iron compounds having a valence of +2 or less.

3 Claims, No Drawings

HYDROCYANATION OF OLEFINS

This application is a division of application Ser. No. 857,535, filed on Sept. 12, 1969, by William C. Drinkard, Jr. and Brian W. Taylor, now U.S. Pat. No. 3,551,474, which in turn is a continuation-in-part of application Ser. No. 680,947 filed on Nov. 6, 1967, by the same inventors, now abandoned.

DESCRIPTION OF THE PRIOR ART

It is known that the addition of hydrogen cyanide to double bonds adjacent an activating group such as a nitrile or acyloxy group, proceeds with relative ease. However, the addition of hydrogen cyanide to nonactivated double bonds proceeds only with difficulty, if at all, and normally requires the use of high pressures of about 1,000 psi or more and high temperatures in the range of 200° to 400° C. U.S. Pat. No. 2,583,984, issued Jan. 29, 1952 to Paul Arthur, Jr., discloses a technique which involves the use of cuprous cyanide and either ferric chloride or ferric bromide for the hydrocyanation of butadiene. This process is not satisfactory for the production of adiponitrile from 3- or 4-pentenenitrile. The selective formation of 4-pentenenitrile from 3-pentenenitriles without formation of the thermodynamically more stable 2-pentenenitrile is believed to be unknown in the art.

SUMMARY OF THE INVENTION

The present invention provides a process or a step in a process which produces nitriles or dinitriles from olefins, under mild conditions, with minimal formation of polymer.

The hydrocyanation process of the present invention is generally applicable to unsaturated compounds of from two to 20 carbon atoms having at least one aliphatic carbon-carbon double bond, the compounds being selected from the group consisting of olefins, cyano-substituted olefins, phenyl-substituted olefins and diolefins. The 3-pentenenitrile, 4-pentenenitrile and 2-methyl-3-butenenitrile are especially preferred. Suitable unsaturated compounds include diolefins such as butadiene or allene, monoolefins and monoolefins substituted with groups which do not attack the catalyst such as cyano. These unsaturated compounds include monoolefins containing from two to 20 carbon atoms such as ethylene, propylene, butene-1, pentene-2, hexene-2, etc., and substituted compounds such as styrene, α-methyl styrene, 3-pentenenitrile, and 4-pentenenitrile. The process also finds special advantage in the production of 2-methyl-glutaronitrile from 2-methyl-3-butenenitrile.

In the preferred process of the present invention wherein adiponitrile is formed from 3-pentenenitrile, the reaction proceeds in two steps. The first step involves the isomerization of 3-pentenenitrile to 4-pentenenitrile. It is followed by the addition of hydrogen cyanide to 4-pentenenitrile to form adiponitrile.

The first step is catalyzed by iron or ruthenium compounds having a valence of +2 or less such as ruthenium pentacarbonyl, iron pentacarbonyl, $Fe_2(CO)_9$, $Fe_3(CO)_{12}$, $Fe(CO)_2I_2$, and the hereinbelow defined compounds for the second step.

A preferred class of catalysts have the structure $[L_mMX_m]_b$ wherein M is selected from the class consisting of Fe and Ru, X is an anion, preferably a chloride, iodide, or cyanide, L is a neutral pi bonding ligand, $n$ has a numerical value of from 2 to 5, the sum of $n$ and $m$ is from 4 to 5 and $b$ has a numerical value of from 1 to 3. The ligands useful as L may be defined as any atoms or molecule capable of functioning as a sigma/pi bonded partner in one or more coordinate bonds. A description of such ligands may be found in "Advanced Inorganic Chemistry" by F. Albert Cotton and G. Wilkinson, published by Interscience Publishers, a division of John Wiley & Sons, 1962, Library of Congress Catalog Card No. 62-14818; particularly on pages 602–606. A preferred class of such ligands includes CO and compounds having the formula $PZ_3$ wherein Z is selected from the class consisting of R and OR wherein R is selected from the class consisting of alkyl and aryl radicals having up to 18 carbon atoms. These same catalysts, particularly in the case where M is Ru, are suitable for use in the hydrocyanation reaction. Preparations of these catalysts may be found in "Advances in Inorganic Chemistry and Radiochemistry", by G. Booth, published by Academic Press, Vol. 6, 1964, Library of Congress Catalog Card No. 59-7692, particularly on pages 13–20.

Both the hydrocyanation reaction or the isomerization of 3-pentenenitrile can be carried out with or without a solvent. The solvent should be a liquid at the reaction temperature and inert towards the unsaturated compound and the catalyst. Generally, such solvents are hydrocarbons such as benzene, xylene, or nitriles such as acetonitrile, benzonitrile, or adiponitrile.

The exact temperature used is dependent, to a certain extent, on the particular catalyst being used, the particular unsaturated compound being used and the desired rate. Generally, temperatures of from −25°C. to 200°C. can be used with from 0°C. to 150°C. being the preferred range for both the isomerization of 3-pentenenitrile and the hydrocyanation of unsaturated compounds.

Either reaction may be carried out by charging a reactor with all of the reactants. In case of hydrocyanation, preferably the reactor is charged with the catalyst or catalyst components, the unsaturated compound and whatever solvent is to be used and the hydrogen cyanide gas is swept over the surface of the reaction mixture or bubbled into the reaction mixture or it may be introduced in liquid form. If desired, when hydrocyanating a gaseous unsaturated organic compound, the hydrogen cyanide and the unsaturated organic compound may be fed together into the reaction medium. The molar ratio of unsaturated compound to catalyst generally is varied from about 10:1 to 2000:1 unsaturated compound to catalyst for a batch operation. In a continuous operation such as when using a fixed bed catalyst type of operation, a much higher proportion of catalyst may be used such as 1:2 unsaturated compound to catalyst.

Optionally, a promoter may be used to activate the catalyst for the hydrocyanation reaction. The promoter generally is a boron compound or a cationic form of a metal selected from the class consisting of zinc, cadmium, beryllium, aluminum, gallium, indium, thallium, titanium, zirconium, hafnium, orbium, germanium, tin, vanadium, niobium, scandium, chromium, molybdenum, tungsten, manganese, rhenium, palladium, thorium, and cobalt. The preferred boron compounds are borohydrides and organoboron compounds of which the preferred borohydrides are the alkali metal borohydrides and the quaternary ammonium borohydrides particularly the tetra (lower alkyl) ammonium borohydrides. Other suitable promoters are salts of the metals listed above and include aluminum chloride, zinc chloride, cadmium iodide, titanium trichloride, titanium tetrachloride, zinc acetate, ethyl aluminum dichloride, chromic chloride, stannous chloride and zinc iodide. The promoter acts to improve catalyst efficiency and, in certain cases, such as the hydrocyanation of 3- or 4-pentenenitrile to adiponitrile, can result in an improved yield.

If desired, an excess of a ligand such as an aryl phosphite or phosphine may also be added to the reaction mixture.

Preferably, the reaction mixture is agitated, such as by stirring or shaking.

The hydrocyanated product can be recovered by conventional techniques such as crystallization of the product from solution or by distillation.

The nitriles formed by the present invention are useful as chemical intermediates. For instance, adiponitrile is an intermediate used in the production of hexamethylene diamine which is used in the production of polyhexamethylene adipamide, a commercial polyamide, useful in forming fibers, films and molded articles. Other nitriles can be converted to the corresponding acids and amines which are conventional commercial products.

DESCRIPTION OF THE PREFERRED EMBODIMENTS

EXAMPLE I

A 50 ml, three-necked round bottom glass flask, fitted with a water cooled reflux condenser connected to a dry ice trap, a gas inlet above the liquid level, and a magnetic stirrer is set up in an oil bath maintained at 100°C. The flask is purged with nitrogen gas and charged with 1.0 mmole [(C$_6$H$_5$)$_3$P]$_3$RuCl$_2$, 2.0 mmole of SnCl$_2$, and 20 g of 3-pentenenitrile. A stream of nitrogen gas is bubbled through liquid hydrogen cyanide contained in a 20 ml flask cooled in an ice bath. The resulting gas mixture is swept across the surface of the reaction mixture in the flask. The nitrogen gas flow is adjusted so that 0.2 ml per hour of hydrogen cyanide (measured as a liquid at 0°C.) is fed to the reaction flask. After 16.5 hours the reaction is shut down.

Gas chromatographic analysis indicates that the crude reaction mixture contains adiponitrile and 2-methylglutaronitrile.

EXAMPLE II

A 50 ml, three-necked round bottom glass flask, fitted with a water cooled reflux condenser connected to a dry ice trap, a gas inlet above the liquid level, and a magnetic stirrer is set up in an oil bath maintained at 100°C. The flask is purged with nitrogen gas and charged with 1.0 mmole of [(C$_6$H$_5$)$_3$P]$_3$RuCl$_2$, 2.0 mmoles of ZnCl$_2$, and 20 g. of 3-pentenenitrile. A stream of nitrogen gas is bubbled through liquid hydrogen cyanide contained in a 20 ml flask cooled in an ice bath. The resulting gas mixture is swept across the surface of the reaction mixture in the flask. The nitrogen gas flow is adjusted so that 0.1 ml per hour of hydrogen cyanide (measured as a liquid at 0°C..) is fed to the reaction flask. After 16.5 hours the reaction is shut down.

Gas chromatographic analysis indicates that the crude reaction mixture contains adiponitrile and 2-methylglutaronitrile.

EXAMPLE III

A 50 ml, three-necked round bottom glass flask, fitted with a water cooled reflux condenser connected to a dry ice trap, a gas inlet above the liquid level, and a magnetic stirrer is set up in an oil bath maintained at 100°C. The flask is purged with nitrogen gas an charged with 2.0 mmoles of [(C$_6$H$_5$)$_3$P]$_3$RuCl$_2$, 2.0 mmoles of ZnCl$_2$, 10 mmoles of

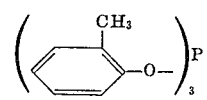

and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.002 ml. per hour of hydrogen cyanide (measured as a liquid at 0°C.) is fed to the reaction flask. After 17 hours and 30 minutes the reaction is shut down.

Gas chromatographic analysis indicates that the crude reaction mixture contains adiponitrile and 2-methylglutaronitrile.

EXAMPLE IV

A 50 ml, three-necked round bottom glass flask, fitted with a water cooled reflux condenser connected to a dry ice trap, a gas inlet tube above the liquid level, and a magnetic stirrer is set up in an oil bath. The flask is purged with nitrogen gas and charged with 0.39 g. of Fe(CO)$_5$, 1.0 ml. of glyme, and 20 g. of 3-pentenenitrile, and further purged with nitrogen gas after which the oil bath is heated to 100°C. for 2 hours at which time the reaction is shut down.

Gas chromatographic analysis indicates that the crude reaction mixture contains 10 per cent 4-pentenenitrile.

EXAMPLE V

A 50 ml, three-necked round bottom glass flask, fitted with a water cooled reflux condenser connected to a dry ice trap, a gas inlet tube above the liquid level, and a magnetic stirrer is set up in an oil bath. The flask is purged with nitrogen gas and charged with 0.39 g. of Fe(CO)$_5$ and 20 g. of 3-pentenenitrile and further purged with nitrogen gas, after which the oil bath is heated to 100°C. for 2 hours at which time the reaction is shut down.

Gas chromatographic analysis indicates that the crude reaction mixture contains 10 per cent 4-pentenenitrile.

EXAMPLE VI

A 50 ml, three-necked round bottom glass flask, fitted with a water cooled reflux condenser connected to a dry ice trap, a gas inlet tube above the liquid level, and a magnetic stirrer is set up in an oil bath. The flask is purged with nitrogen gas and charged with 0.96 g. of [(C₆H₅)₃P]₃RuCl₂, 0.19 g. of SnCl₂, and 20 g. of 3-pentenenitrile, and further purged with nitrogen gas after which the oil bath is heated to 100°C. for 72 hours at which time the reaction is shut down.

Gas chromatographic analysis indicates that the crude reaction mixture contains 10 per cent 4-pentenenitrile.

For Examples VII, VIII and IX, the apparatus and procedure are as described for Example I.

EXAMPLE VII

The reaction flask is charged with 1.0 g. of RuCl₃, 0.33 g. of Zn dust, 6.2 g. of P(OC₆H₅)₃ and 20 g. of 3-pentenenitrile. The mixture is maintained at 100°C. for 22 hours while HCN sweeps across the reaction at a rate of 0.4 ml/hour (measured as liquid at 0°C.).

Gas chromatographic analysis shows that the crude product contains 0.279 percent 2-methylglutaronitrile.

EXAMPLE VIII

The reaction flask is charged with 2.5 g. of Fe₃(CO)₁₂ and 20 g. of 3-pentenenitrile. The mixture is maintained at 120°C. for 20.5 hours while HCN sweeps across the reaction at a rate of 1.0 ml/hour (measured as liquid at 0°C.).

Gas chromatographic analysis shows that the crude product contains 1.38 percent ethylsuccinonitrile.

EXAMPLE IX

The reaction flask is charged with 2.5 g. of Fe₃(CO)₁₂ and 20 g. of 3-pentenenitrile. The mixture is maintained at 120°C. for 20 hours while HCN sweeps across the reaction at a rate of 0.2 ml/hour (measured as liquid at 0°C.).

Gas chromatographic analysis shows that the crude product contains 0.128 percent adiponitrile, 0.563 percent 2methylglutaronitrile and 0.129 percent ethylsuccinonitrile.

For Examples X to XVII, the apparatus and procedure are as described in Example VI.

EXAMPLE X

The reaction flask is charged with 2.0 g. of Fe₂(CO)₉ and 20 g. of 3-pentenenitrile. The mixture is maintained at 80°C. for 16 hours.

Gas chromatographic analysis shows that the crude product contains 3.85 percent 4-pentenenitrile.

EXAMPLE XI

The reaction flask is charged with 2.0 g. of [(CH₃CH₂)₃NH] [Fe₃H(CO)₁₁] and 20 g. of 3-pentenenitrile. The mixture is maintained at 80°C. for 16 hours.

Gas chromatographic analysis shows that the crude product contains 5.3 percent 4-pentenenitrile.

EXAMPLE XII

The reaction flask is charged with 2.5 g. Fe₃(CO)₁₂ and 10 g. of 3-pentenenitrile. The mixture is maintained at 100°C. for 2 hours.

Gas chromatographic analysis shows that the crude product contains 6.17 percent 4-pentenenitrile.

EXAMPLE XIII

The reaction flask is charged with 3.0 g. of Fe(CO)₂I₂ and 20 g. of 3-pentenenitrile. The mixture is maintained at 100°C. for 16 hours.

Gas chromatographic analysis shows that the crude product contains 0.22 percent 4-pentenenitrile.

EXAMPLE XIV

The reaction flask is charged with 1.0 g. of

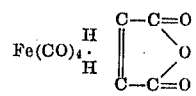

and 20 g. of 3-pentenenitrile. The mixture is maintained at 80°C. for 23 hours.

Gas chromatographic analysis shows that the crude product contains 0.99 percent 4-penetenenitrile.

EXAMPLE XV

The reaction flask is charged with 0.7 g. of H₂Fe[P(OC₂H₅)₃]₄, 0.2 g. of I₂ and 10 ml. of 3-pentenenitrile. The mixture is maintained at 80°C. for 17.5 hours.

Gas chromatographic analysis shows that the crude product contains 4.4 percent 4-pentenenitrile.

EXAMPLE XVI

The reaction flask is charged with 1.0 g. of Fe₃(CO)₁₂ and 10 ml. of 3-pentenenitrile. The mixture is maintained at 100°C. for 22 hours.

Gas chromatographic analysis shows that the crude product contains 11.0 percent 4-pentenenitrile.

EXAMPLE XVII

The reaction flask is charged with 1.0 g. of Fe₂(CO)₉ and 10 ml. of 3-pentenenitrile. The mixture is maintained at 100°C. for 22 hours.

Gas chromatographic analysis shows that the crude product contains 7.5 percent 4-pentenenitrile.

We claim:

1. A process of hydrocyanating an unsaturated organic compound of the group consisting of 3-pentenenitrile, 4-pentenenitrile and 2-methyl-3-butenenitrile which comprises contacting the organic compound with hydrogen cyanide and a catalyst consisting essentially of a compound having the structure $[L_nMX_m]_b$ wherein M is a metal selected from the class consisting of iron and ruthenium, $n$ has a numerical value of from 2 to 5, the sum of $n$ and $m$ is from 4 to 5, $b$ has a numerical value from 1 to 3, X is selected from the class consisting of chloride, iodide and cyanide, L is a sigma/pi bonding neutral ligand of the class consisting of CO and PZ₃ wherein Z is selected from the class consisting of OR and R wherein R is an aryl group having up to 18 carbon atoms, the molar ratio of unsaturated organic compound to catalytic compound being from 1:2 to 2000:1, at a temperature of from −25°C. to 200°C. and forming at least one organic cyano compound by addition of hydrogen cyanide to the carbon-carbon double bond of the organic compound.

2. The process of claim 1 wherein $[L_nMX_m]_b$ is [(C₆H₅)₃P]₃RuCl₂.

3. The process of claim 1 wherein $[L_nMX_m]_b$ is Fe₃(CO)₁₂.

* * * * *

UNITED STATES PATENT OFFICE
CERTIFICATE OF CORRECTION

Patent No. 3,697,485          Dated October 10, 1972

Inventor(s) Rambosek, et al

It is certified that error appears in the above-identified patent and that said Letters Patent are hereby corrected as shown below:

Column 3, line 36, "2,2,3,4-" should read -- 2,2,3,3- --.

line 51, "representatives" should read -- representatively --.

Column 5, line 5, "Convention" should read -- Conventional --.

Column 8, line 18, "actalyst" should read -- catalyst --.

Column 10, line 64, "bioborate" should read -- biborate --.

Column 11, line 1 and 2 should read -- function of time was observed. Results are set forth below --.

Column 13, line 3, "was" should read -- with --.

Signed and sealed this 10th day of April 1973.

(SEAL)
Attest:

EDWARD M. FLETCHER, JR.
Attesting Officer

ROBERT GOTTSCHALK
Commissioner of Patents